United States Patent [19]

Song

[11] Patent Number: 4,740,087

[45] Date of Patent: Apr. 26, 1988

[54] MAGNETIC PARTICLE BATH SUSPENSION APPARATUS

[75] Inventor: Sei H. Song, Des Plaines, Ill.

[73] Assignee: Illinois Tool Works Inc., Chicago, Ill.

[21] Appl. No.: 942,207

[22] Filed: Dec. 16, 1986

[51] Int. Cl.[4] ........................ B01F 13/02; B01D 47/02

[52] U.S. Cl. ........................................ 366/101; 261/77

[58] Field of Search ................................ 366/101-107; 261/77; 209/170; 34/102

[56] References Cited

U.S. PATENT DOCUMENTS

| | | | |
|---|---|---|---|
| 642,460 | 1/1900 | Kersten | 261/77 X |
| 708,058 | 9/1902 | Martinson | 261/77 |
| 1,847,659 | 3/1932 | MacLennan | 209/170 |
| 3,183,120 | 5/1965 | Mori | 15/3 X |
| 3,647,188 | 3/1972 | Solt | 366/107 |
| 3,759,669 | 9/1973 | Aaron et al. | 261/77 X |
| 3,807,705 | 4/1974 | Humkey et al. | 366/101 |
| 3,953,003 | 4/1976 | Mahig | 366/101 |
| 4,128,343 | 12/1978 | Moked et al. | 366/107 X |
| 4,183,787 | 1/1980 | Roesler et al. | 261/77 X |
| 4,249,828 | 2/1981 | Condolios | 366/102 |

*Primary Examiner*—David Werner
*Attorney, Agent, or Firm*—J. P. O'Brien

[57] ABSTRACT

An apparatus for properly mixing the constituents of a suspension is disclosed. The apparatus comprises a tank for holding a desired quantity of suspension with an inlet at its base having an air supply affixed to the inlet for supplying air into the tank and for combination with the suspension. Additionally a funnel is used for directing the air combined with the suspension upward through the tank and a dispersion member for properly dispersing particles within the suspension and for removing the particles from the sides and bottom of the tank may also be employed.

7 Claims, 2 Drawing Sheets

MAGNETIC PARTICLE BATH SUSPENSION APPARATUS

BACKGROUND OF THE INVENTION

The present invention generally relates to the magnetic particle testing area of non-destructive testing and, more particularly, to an apparatus which assures proper mixing of the magnetic particle bath suspension at all times.

Magnetic particle testing is a well known method of nondestructive testing which is used to indicate defects in ferromagnetic materials. These defects may be detected by magnetizing a part to cause localized magnetic leakage fields to occur at points on the surface of the part where there are cracks or the like forming magnetic discontinuities. Such leakage fields, and therefore cracks, can then be detected by dispersing finally divided composite magnetic particles over the surface of the part which will concentrate at regions where the leakage fields are produced. Normally, dispersement of these fine particles is accomplished in what is known as a "wet" process by dipping the entire part into a suspension, or spraying the suspension into the parts, which is composed of either an oil or water carrier and these fine composite magnetic particles.

Such testing is very successful but relies on the proper concentration of fine composite magnetic particles and carrier within the suspension to insure accurate results. If the proper concentration is not maintained, then the sensitivity of the test is decreased when the suspension has a low magnetic particle concentration and too much background is present when it has a high concentration. Moreover, since the composite magnetic particles are more dense than the carrier, they readily settle to the bottom of the suspension. Therefore, it is also imperative that the magnetic particle suspension be properly mixed on a continuing basis to insure proper results.

Existing magnetic particle testing systems rely on a pump to maintain proper mixing of the suspension as it circulates through the system. This system is undesirable not only because proper mixing is not maintained but, more importantly, the force of the pumps impeller produces too much shearing action for the magnetic particles. This is critical because the composite magnetic particles are actually composed of a fine magnetic particle which is attached to a pigment in a complex process. These pigments provide a visual indication of a defect in an object after the magnetic leakage fields attract the magnetic particle portion of the composite magnetic particle. Therefore, the presence of excessive shear forces in the mixing system causes the pigment to separate from the magnetic particle thereby reducing the effectiveness of the test.

The apparatus of the present invention overcomes these problems by providing a unique suspension mixing system which relies on gravity and air, injected within the suspension, to provide proper suspension mixing without any shear forces to separate the magnetic particles. In this system, air is injected through an inlet valve into the bottom of a mixing tank containing a desired concentration of suspension. Dispersed within the center of the tank is an elongated hollow tube which is positioned slightly above the inlet valve to channel the air, now in a bubbling form, to the top of the suspension. As the air enters the bottom of the tank, it contacts the suspension before it enters the tube and pushes the suspension up the tube. After reaching the top of the tube, the air escapes to the atmosphere and the suspension from the bottom now exits into the top of the suspension where the composite magnetic particles begin to settle to the bottom again, thereby providing a constant flow of suspension within the tank.

To prevent settling and sticking of the magnetic particles to the bottom of the tank, the tank is first provided with a conical bottom. Secondly, a conical or umbrella shaped member is affixed along the length of the hollow tube with its large open end facing the bottom of the tank at a position slightly above the conical shaped tank bottom. Finally, small "scrubber" beads, having a density greater than the composite magnetic particles, are introduced into the suspension. These beads are circulated in the same way the magnetic particle suspension is. However, after falling back through the suspension, they roll down the outer side of the umbrella shaped member as well as the sides of the conical bottom to further mix the magnetic particles and prevent their settling and sticking to the bottom of the tank.

It is therefore an object of the present invention to provide a proper system and apparatus for mixing magnetic particle suspension.

It is a feature of this invention to have scrubber beads within a suspension which are circulated along with the suspension by rising air injected into the bottom of a mixing tank.

It is an advantage of the present invention that the system does not impart shearing forces within the suspension while properly mixing the magnetic particles of the suspension and preventing particles from settling on the walls of the mixing tank.

BRIEF DESCRIPTION OF THE DRAWINGS

The features of the present invention which are believed to be novel are set forth with particularity in the appended claims. The invention, together with further objects and advantages thereof may best be understood by making reference to the following description taken in conjunction with the accompanying drawings, in the several figures of which like reference numerals identify identical elements and wherein:

DESCRIPTION OF THE PREFERRED EMBODIMENT

Figure 1:
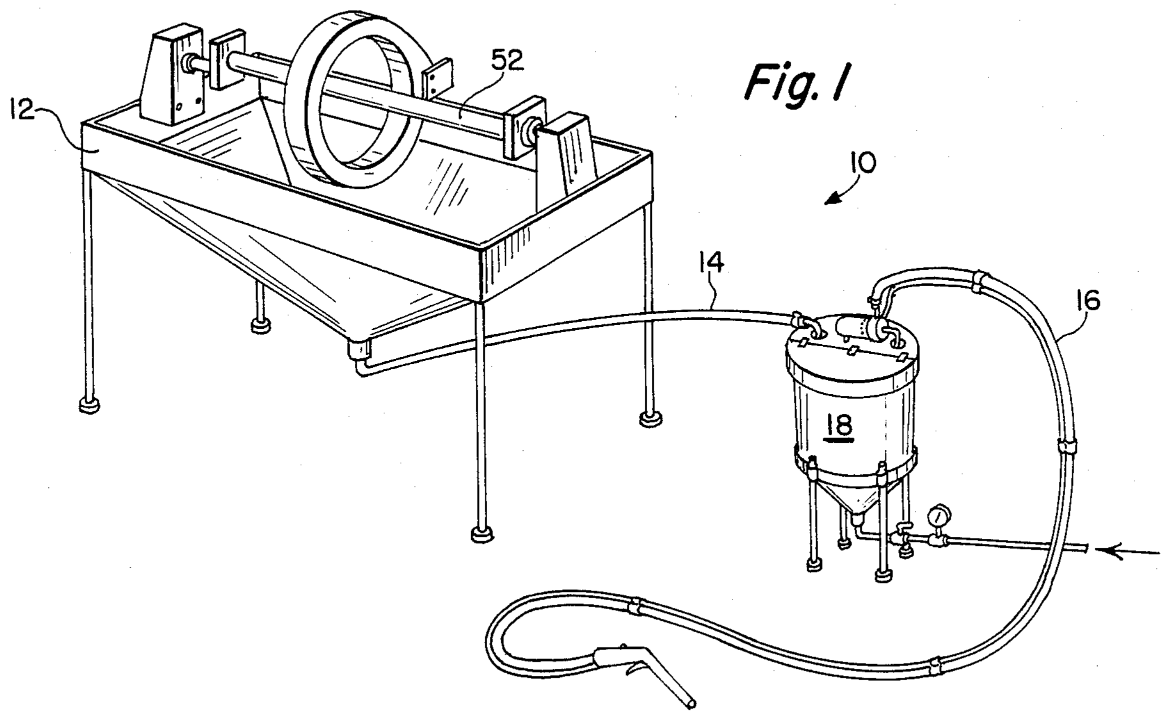
FIG. 1 is a perspective view of a magnetic particle testing system including the mixing apparatus of the present invention.

Referring now to the drawings in greater detail, there is illustrated in FIG. 1 a magnetic particle testing system 10 constructed according to the teachings of the present invention.

The system 10, consists of magentic particle inspection table 12, inlet hose 14, outlet hose 16 and mixing tank 18.

The inspection table 12 can be any type of table that is commonly used in the art of magnetic particle testing to properly retrieve suspension which is applied to a part under test. As is well known in the art, the suspension normally consists of about 1 gram of composite magnetic particles per liter of carrier.

Figure 2:
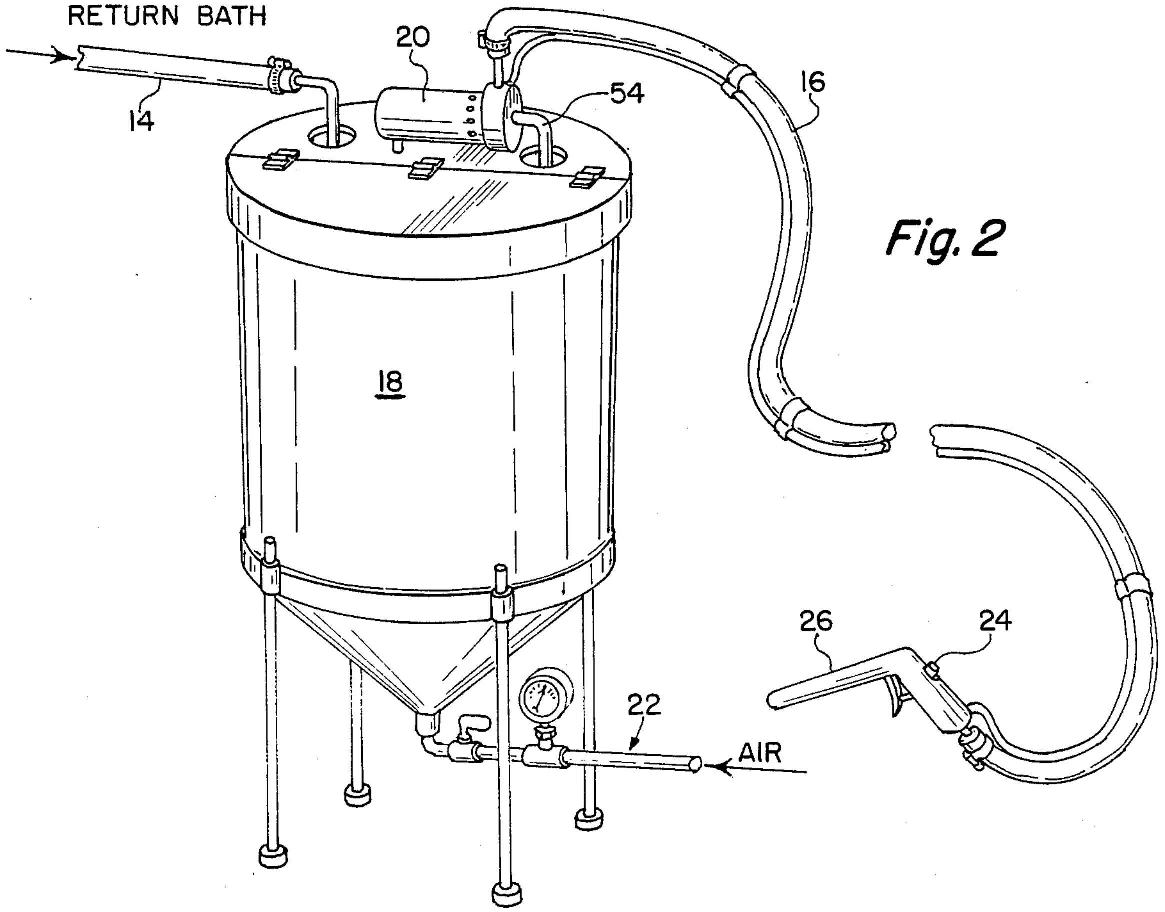
FIG. 2 is an enlarged perspective view of the apparatus of the present invention illustrated in FIG. 1.
Figure 3:
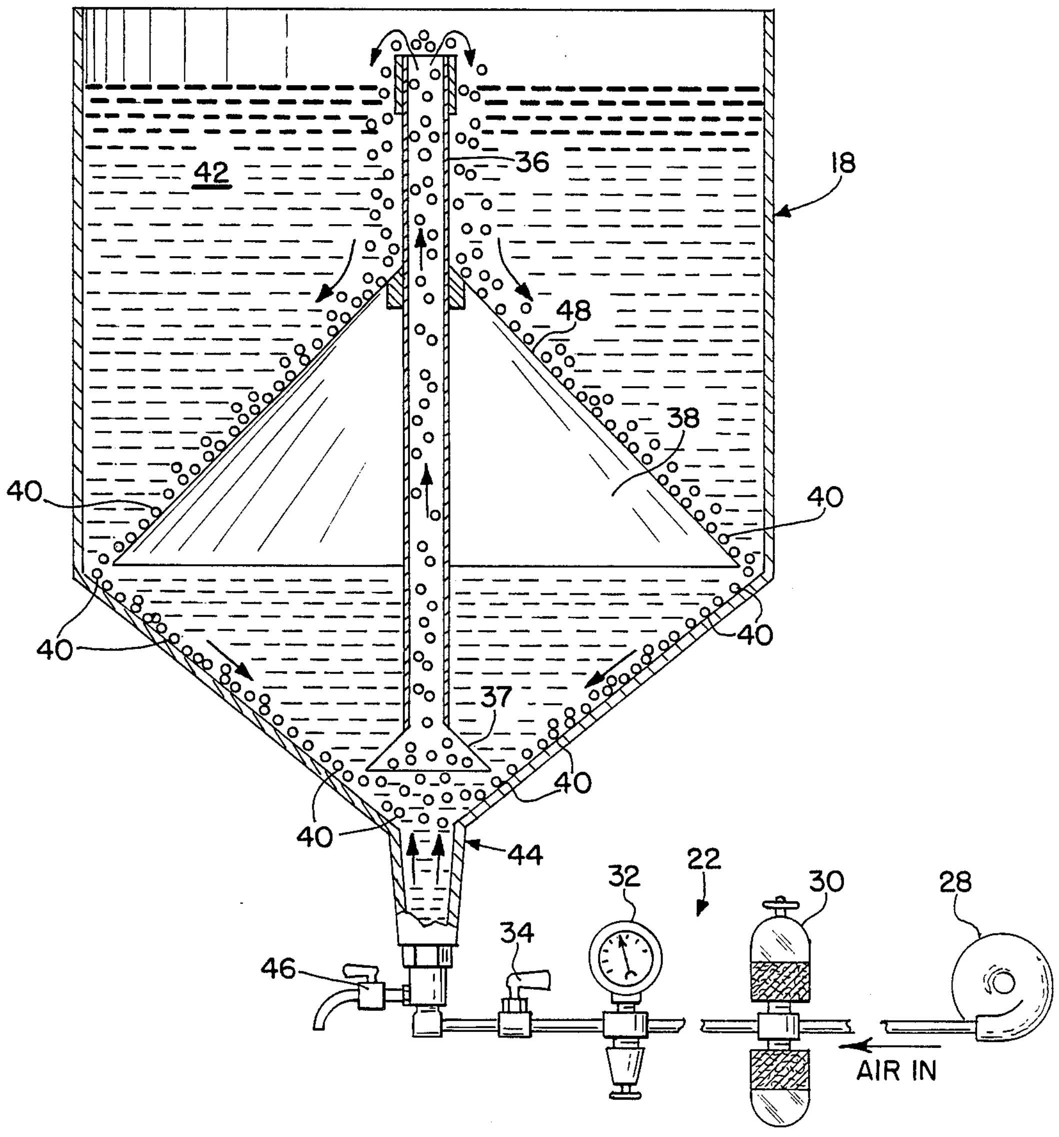
FIG. 3 is a partial sectional view of the apparatus of the present invention, taken along lines 3—3 of FIG. 2, without its top.

The mixing tank 18 is more properly illustrated in FIGS. 2 and 3 and consists externally of an inlet hose 14, outlet hose 16, pump 20 and air inlet 22.

The pump 20 is normally idle and is only in use to spray suspension onto a part under test at the inspection table 12. This will limit he use of the pump and prevent shearing of the composite magnetic particles. Previous systems constantly circulated the suspension by a pump which, as mentioned bove, separated the magnetic particle from the pigment particle. The pump 20 is activated by a switch 24 affixed to a trigger spray nozzle 26 at the end of outlet hose 16.

The air inlet hose 22 can be any type of air supply and in the present embodiment consists of an air pump 28, air filter 30, air regulator and pressure gauge 32 and air valve 34.

As FIG. 3 illustrates, mixing tank 18 consists internally of an elongated hollow dispersion tube 36, umbrella dispersion member 38, scrubber beads 40 and suspension 42. Additionally, the preferred embodiment illustrates the tank 18 as having a conical bottom 44 with a liquid drain valve 46, but it is to be noted that any shaped tank may be used which will properly disperse the suspension 42 along the tank bottom.

The dispersion tube 36 is fluted at its bottom end 37 which is located proximate the conical bottom 44 of the tank 18. Dispersion tube 36 can be affixed within the tank 18 by any means which will support the tube 36 as well as the umbrella 38 which is affixed to tube 36 and is accomplished in the preferred embodiment by three legs (not shown) which are affixed by a screw or other fastening means to the bottom of tank 18. The location of the fluted end 37 of the tube 36 is such that any air rising through the tank 18 is forced to go up the tube 36 and not into the other parts of the tank 18 while enabling suspension 42, with the scrubber beads 40, to mix with the air before entering the tube 36. This process will be described in further detail hereinafter.

Scrubber beads 40 are added to the suspension 42 to provide proper dispersion of the suspension as well as preventing composite magnetic particles from building up by adhesion to the conical bottom 44 of the tank 18. These scrubber beads 40 can be composed of any material, but should be chosen so that the material is not detrimental to the magnetic particles being suspended.

The size of the beads 40 is not critical and have been chosen in the preferred embodiment to have a diameter from 0.10" (2.5 mm) to 0.30" (7.6 mm) since these size beads are readily available.

The important criteria for the scrubber beads 40 is their density. Obviously, to enable the beads to roll to the bottom of the tank from gravity, their density must be greater than the density of the suspension. At the same time, however, their density should not be significantly greater than the suspension so that they may fall at a relatively slow rate through the suspension and will rise through the suspension by means of the injected air. In the preferred embodiment, scrubber beads were chosen having a density of 1.04 9/cc to 1.70 9/cc depending on the density of the suspension. The beads can be formed of a non-metallic plastic material. Examples include nylon, polycarbonate, polyvinyl chloride, polystyrene, polysulfone or ethylenetetraflouroethylene.

In operation, suspension 42 is introduced into the tank 18 from the inspection table 12 by inlet hose 14 with the drain valve 46 in the closed position. Next, a desired amount of beads 40 are put into the suspension 42. Next, air is introduced into the tank 18 via air inlet 22 and begins rising through the suspension 42 at the bottom 44 of the tank 18. As the air rises, it catches scrubber heads 40 near the bottom 44 of the tank 18 and carries them, along with the suspension 42, upwards through the dispersion tube 36. At the top of the dispersion tube 36, the air is allowed to escape from the system while the suspension 42 along with scrubber beads 40 return to the suspension 42 of the tank 18. At this point, the magnetic particles of the suspension 42 as well as the beads 40 fall downward through the suspension 42 due to gravity. Upon reaching the outside wall 48 of the umbrella 38, the beads 40 begin following along the wall 48 and prevent magnetic particles from accumulating. The beads 40 then fall onto the conical bottom 44 of the tank 18 and similarly prevent magnetic particles from accumulating and direct them back to the base of the conical bottom 44 and into the air flow to repeat the process.

When suspension 42 is needed at the inspection table 12, the operator positions the trigger spray nozzle 26 of outlet hose 16 over the suspension table 12 to spray suspension 42 over a workpiece to be inspected 52. The operator then depresses pump switch 24 which activates pump 20 which pumps suspension 42 through outlet hose 16 and trigger spray nozzle 26 to the workpiece 52. Although the input side 54 of pump 20 is not shown in detail, it can be any type of tube or hose whose end is immersed within the suspension 42, preferably above umbrella 38 of tank 18. Additionally, a large particle filter may be provided to prevent scrubber beads 40 from being pumped out of tank 18 which allows the suspension 42 to pass.

In another embodiment, a workpiece 52 may be previously magnetized and then placed in an immersion tank (not shown) which has an outlet which will communicate with the suspension apparatus of the present invention to provide proper mixing of the suspension.

While a particular embodiment of the present invention has been shown and described, modifications may be made to the system without departing from the teachings of the present invention. Accordingly, the scope of the invention is only to be limited as necessitated by the accompanying claims.

I claim:

1. An apparatus for properly mixing the constituents of a suspension comprising:

tank means for holding a desired quantity of suspension, said tank means having an inlet at its base;

air supply means affixed to said inlet for supplying air into said tank means and for combination with said suspension;

funnelling means for directing said air combined with said suspension upward through said tank means; and dispersion means for properly dispersing particles within said suspension and for removing said particles from the sides and bottom of said tank means;

said dispersion means including a plurality of beads within said tank means having a density which is greater than the density of said suspension and said density of said beads permits said beads to be carried by said air of said air supply means vertically upward through said funnelling means to the top of said tank means where said air escapes to the atmosphere and said beads return back to said tank means along with said suspension and fall towards said tank bottom to provide proper dispersion of said suspension without excessive shear forces.

2. The apparatus of claim 1, wherein said funnelling means further comprises:

an elongated hollow tube having a length proximate the central depth of said tank means whose bottom end is outwardly flared to readily accept said air combined with said suspension and said beads to provide a path to the top of said tank means.

3. The apparatus of claim 1, wherein said dispersion means further comprises:

a conical shaped dispersion means within said tank means affixed to said funnelling means with its larger open end facing the bottom of said tank means to provide proper dispersion of said suspension around the periphery of said tank means.

4. An apparatus for properly mixing the constituents of a suspension comprising:

a mixing tank having an inlet at its base;

an elongated hollow tube affixed within the center of said tank which has a length proximate the central depth of said tank whose bottom end is outwardly flared;

a conical shaped dispersion member within said tank affixed to said elongated hollow tube intermediate its length with its larger open end facing the bottom of said tank;

air supply means affixed to said inlet for supplying air into said tank; and a plurality of beads within said tank having a density which is greater than the density of said suspension and said density of said beads permits said beads to be carried by said air injected by said air supply means and said suspension vertically upward through said elongated hollow tube to its top where said air escapes to the atmosphere and said beads return back to the tank along with said suspension and fall towards the bottom of said tank while rolling along the top outside wall of said dispersion member and the bottom of said tank toward said air supply means to provide proper dispersion of said suspension without excessive shear forces.

5. The apparatus of claim 4, wherein said mixing tank has a conical shaped bottom.

6. The apparatus of claim 4, wherein said beads have a diameter of between 0.10" (2.5 mm) to 0.30" (7.6 mm) and a density of between 1.04 9/cc and 1.70 9/cc.

7. The apparatus of claim 4, wherein said beads are a non-metallic plastics selected from the group consisting of nylon, polycarbonate, polyvinyl chloride, polystyrene, polysulfone and ethylenetetrafluoroethylene.

* * * * *